United States Patent
Nalepa

(10) Patent No.: US 8,313,543 B2
(45) Date of Patent: Nov. 20, 2012

(54) BROMINE CHLORIDE COMPOSITIONS FOR REMOVING MERCURY FROM EMISSIONS PRODUCED DURING FUEL COMBUSTION

(75) Inventor: Christopher J. Nalepa, Zachary, LA (US)

(73) Assignee: Albemarle Corporation, Baton Rouge, LA (US)

( * ) Notice: Subject to any disclaimer, the term of this patent is extended or adjusted under 35 U.S.C. 154(b) by 12 days.

(21) Appl. No.: 13/063,346

(22) PCT Filed: Sep. 24, 2009

(86) PCT No.: PCT/US2009/058131
§ 371 (c)(1),
(2), (4) Date: Mar. 10, 2011

(87) PCT Pub. No.: WO2010/036750
PCT Pub. Date: Apr. 1, 2010

(65) Prior Publication Data
US 2011/0165044 A1   Jul. 7, 2011

Related U.S. Application Data

(60) Provisional application No. 61/099,855, filed on Sep. 24, 2008.

(51) Int. Cl.
*B01D 53/02* (2006.01)
*B01D 53/64* (2006.01)
*B01J 20/00* (2006.01)
*C10L 5/00* (2006.01)
*C10L 5/32* (2006.01)

(52) U.S. Cl. .......... 44/620; 423/210; 502/400; 502/417; 502/427

(58) Field of Classification Search .................. 423/210; 502/400, 417, 427; 44/620
See application file for complete search history.

(56) References Cited

U.S. PATENT DOCUMENTS

| | | | |
|---|---|---|---|
| 6,558,454 B1 | 5/2003 | Chang et al. | |
| 7,479,263 B2 * | 1/2009 | Chang et al. | 423/210 |
| 2004/0003716 A1 | 1/2004 | Nelson, Jr. | |
| 2006/0057044 A1 | 3/2006 | Chang et al. | |
| 2006/0185226 A1 | 8/2006 | McDonald et al. | |
| 2006/0210463 A1 | 9/2006 | Comrie | |
| 2007/0179056 A1 | 8/2007 | Baek et al. | |
| 2008/0134888 A1 | 6/2008 | Chao et al. | |
| 2009/0155149 A1 * | 6/2009 | Chang et al. | 423/210 |
| 2010/0272621 A1 * | 10/2010 | Chang et al. | 423/210 |
| 2011/0165044 A1 * | 7/2011 | Nalepa | 423/210 |

FOREIGN PATENT DOCUMENTS

| | | |
|---|---|---|
| EP | 1645323 | 4/2006 |
| WO | WO 2005/092477 | 10/2005 |
| WO | WO 2006/101499 | 9/2006 |

* cited by examiner

*Primary Examiner* — Timothy Vanoy
(74) *Attorney, Agent, or Firm* — Marcy M. Hoefling

(57) ABSTRACT

Compositions, and processes utilizing such compositions, are provided for reducing mercury emissions during fuel combustion Such compositions comprise a sorbent, a bromine source and a chlorine source Such compositions exhibit improved thermal stability as compared to that of the sorbent by itself.

11 Claims, 1 Drawing Sheet

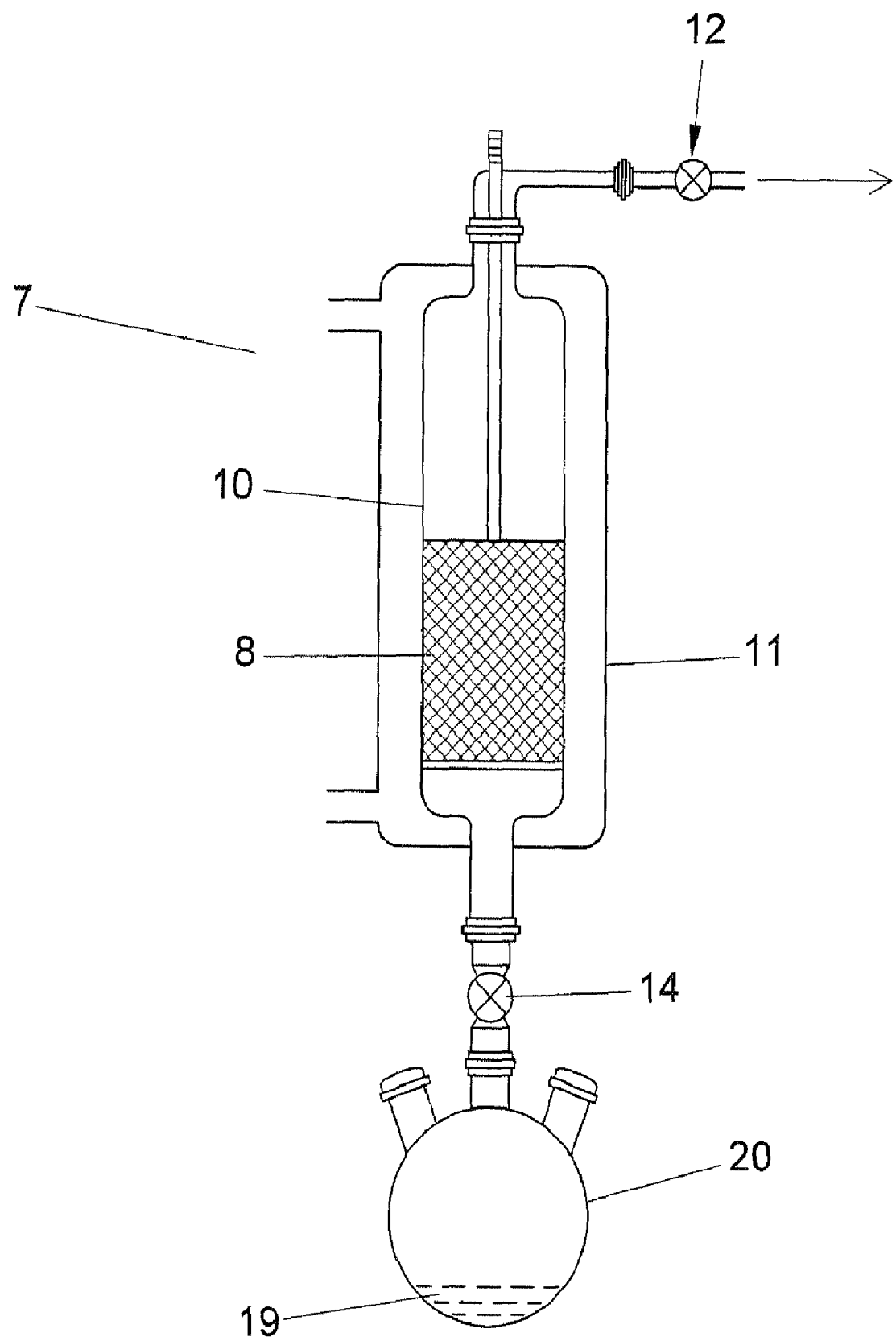

BROMINE CHLORIDE COMPOSITIONS FOR REMOVING MERCURY FROM EMISSIONS PRODUCED DURING FUEL COMBUSTION

BACKGROUND

This application is a 371 of international application PCT/US09/58131 filed Sep. 24, 2009, which claims the benefit of provisional application 61/099,855 filed Sep. 24, 2008.

In 2005, the EPA issued the Clean Air Mercury Rule to cap and reduce mercury emissions from coal-fired power plants. This rule, combined with the EPA's Clean Air Interstate Rule (CAIR) or other rules, may require significant reduction in mercury emissions from coal-fired power plants in the U.S. as early as 2010.

Significant coal resources exist around the world that have the potential to satisfy much of the world's energy needs for a long period of time. The U.S. has large amounts of low-sulfur coal sources, e.g. Powder River basin coal in Wyoming and Montana, but such sources contain non-negligible amounts of mercury in both the elemental and oxidized forms. Thus, some type of mercury emission mediation technology is necessary in order for coal-fired energy plants to utilize such sources of coal without substantial mercury emissions.

The Department of Energy has presented information from several studies that indicate mercury emissions during combustion of coal fuels can be lowered by treatment of the coal fuel stocks with low levels of bromine.

Brines that are produced in several areas of the world contain substantial quantities of bromide salts, such as sodium bromide. Bromine can be recovered from such brines by treatment with chlorine to oxidize the bromide to bromine. Processes for electrolytic conversion of bromide to bromine are also known; but electrolytic conversion is an expensive alternative to the aforedescribed process. Catalytic oxidation of bromide to bromine by use of oxygen or air mixtures has been reported; but no successful, economic, commercial operation is in place today.

It is known to remove hazardous gaseous components from a gaseous effluent by dispersing a fine particulate sorbent evenly in the effluent to contact and capture, in flight, the targeted gaseous component followed by mechanically removal of the sorbent with its adsorbate from the effluent vapor by electrostatic precipitators (ESP), fabric filters (FF), or wet scrubbers. A highly efficacious sorbent is powdered activated carbon (PAC). The PAC can be used with or without modification. Modified PACs are claimed to enhance capture of the target hazardous substance by enhancing adsorption efficiency. PAC modification is exemplified by U.S. Pat. No. 4,427,630; U.S. Pat. No. 5,179,058; U.S. Pat. No. 6,514,907; U.S. Pat. No. 6,953,494; US 2001/0002387; US 2006/0051270; and US 2007/0234902.

Thermal stability can be problematic with PACs and other sorbents; e.g., when a PAC is used in the treatment of warm or hot gaseous effluents or when packaged or collected in bulk amounts, self-ignition can result from unmitigated oxidation of the PAC and can lead to its smoldering or burning. Bulk PAC can be encountered, e.g., when the PAC is packaged, such as in super-sacks or when formed as a filter cake in a FF unit or collected in silos or hoppers associated with an ESP, etc. Self-ignition can be exacerbated by the PAC being warm or hot as could be the case when treating coal-fired boiler effluents. If oxygen (air) is not denied to the oxidation site or if the site is not cooled, the heat from the initial oxidation can propagate until the PAC smolders or ignites. Such an ignition can be catastrophic. Utility plants are especially sensitive about self-ignition as smoldering or fire within the effluent line can cause plant shut-down with widespread consequences to customers.

Given the foregoing, it would be commercially beneficial to have new processes for minimizing mercury emissions from coal and other fuel stocks. Additionally, it would be advantageous to have PACs and other sorbents with improved thermally stability.

THE INVENTION

This invention meets the above-described needs by providing compositions and processes for reducing mercury emissions from combustion gas streams produced during combustion of coal and other combustible fuels. Compositions of this invention comprise a bromine source, a chlorine source and a sorbent capable of adsorbing bromine and chlorine. This invention also provides such compositions and processes wherein the composition has an improved thermal stability as compared to that of the sorbent by itself. As used herein and in the claims, the terms "reducing mercury emissions" and/or "to reduce mercury emissions" means removing and/or to remove any amount of mercury from the emissions by any mechanism, e.g., adsorption or absorption, such that the amount of mercury emitted into the atmosphere upon burning of the fuel is reduced as compared to the amount that would be emitted absent use of the compositions and/or processes of this invention. Sorbent compositions of this invention can be added to a combustion gas stream resulting from combustion of a combustible fuel. Additionally, sorbent compositions of this invention can be added to (combined with) the fuel before and/or during combustion. Additionally, this invention contemplates adding sorbent compositions of this invention to the fuel before and/or during combustion and into the combustion gas. The sorbent compositions comprise a source of bromine, a source of chlorine, and a sorbent capable of adsorbing bromine and chlorine.

Processes of this invention can comprise: adding a composition comprising a bromine source, a chlorine source, and a sorbent capable of adsorbing bromine and chlorine to a combustion gas stream produced during combustion of one or more combustible fuels; thereby reducing mercury emissions from the combustion gas stream. In such processes, the bromine source can comprise bromine or HBr, the chlorine source can comprise chlorine or HCl, the bromine source and/or the chlorine source can comprise bromine chloride. The composition also can comprise bromine chloride. Also in such processes, the sorbent can comprise a carbonaceous substrate, an activated carbon, a wood-derived activated carbon, or a coconut shell-derived activated carbon. Also, the combustion gas stream can be derived from combustion of coal or from another substrate. In processes of this invention, the composition can have a PIO that is at least about 10 deg C higher than the PIO of the sorbent alone.

Process of this invention can comprise: adding a composition comprising a bromine source, a chlorine source, and a sorbent capable of adsorbing bromine and chlorine to a combustible fuel prior to and/or during combustion of the combustible fuel; combusting the combustible fuel; producing a combustion gas stream; thereby reducing mercury emissions from the combustion gas stream. In such processes the combustible fuel can comprise coal or another substance. Also, the sorbent can comprise a carbonaceous substrate, activated carbon, a wood-derived activated carbon, or a coconut shell-derived activated carbon. In such processes the composition can have a PIO that is at least about 10 deg C higher than the PIO of the sorbent alone. Processes of this invention can comprise: adding a composition comprising bromine chloride and a sorbent capable of adsorbing bromine and chlorine to a combustible fuel prior to and/or during combustion of the combustible fuel; combusting the combustible fuel; producing a combustion gas stream; thereby reducing mercury emissions from the combustion gas stream.

This invention also provides compositions capable of reducing mercury emissions from a combustion gas stream, such compositions can comprising a bromine source, a chlorine source and a sorbent capable of adsorbing bromine and chlorine. In such compositions, the bromine source can comprise bromine or HBr, the chlorine source can comprise chlorine or HCl, or the bromine source and/or the chlorine source can comprise bromine chloride. The composition can also comprise bromine chloride. In composition of this invention, the sorbent can comprise a carbonaceous substrate, activated carbon, a wood-derived activated carbon, or a coconut-shell derived activated carbon. Compositions of this invention can have a PIO that is at least about 10 deg C higher than the PIO of the sorbent alone.

FIGURES

The invention will be better understood by reference to the FIGURE (FIG. 1), which illustrates a procedure that can be used to incorporate bromine and chlorine onto sorbents such as activated carbon.

Sorbent compositions according to this invention can be added to/combined with the combustible fuel and/or combustion gas stream in the form of a solid, e.g., in powder or granule form, or in the form of a liquid. The sorbent compositions can be added to a combustion gas stream that is at a temperature from about 150 deg C to about 400 deg C. For example, in cold-side ESPs (electrostatic precipitators), injection of the sorbent composition can take place at combustion gas stream temperatures from about 150 deg C to about 200 deg C. Or, in hot-side ESPs, injection of the sorbent composition can take place at combustion gas stream temperatures from about 300 deg C to about 400 deg C.

Sorbent

Sorbents that are suitable for use in this invention include, for example, activated carbon, activated charcoal, activated coke, carbon black, powdered coal, char, unburned or partially-burned carbon from a combustion process, kaolinites or other clays, zeolites, alumina, and other carbonaceous substrates. Wood-derived PACs are particularly suitable for use in this invention, including those derived from woody materials such sawdust, woodchips, or other particulate wood products. Coconut shell-derived PACs are also suitable for use in this invention. Other suitable sorbents will be known, or may come to be known, to those skilled in the art and having the benefit of the teachings of this specification.

Bromine/Chlorine Sources

Suitable bromine sources for use in this invention include $Br_2$ and bromine precursors such as HBr. NaBr and KBr are not suitable bromine sources for use in this invention. In one aspect, bromine sources of this invention exclude NaBr and KBr, and can be referred to as non-sodium or potassium derived bromine sources. As used herein, when NaBr and KBr are excluded and/or the term non-sodium or potassium derived bromine sources mean that no NaBr, KBr, sodium, or potassium are intentionally added. Suitable chlorine sources include $Cl_2$ and chlorine precursors such as HCl. Additionally, suitable sources for $Br_2$ and/or $Cl_2$ include compounds comprising both bromine and chlorine precursors, e.g., bromine chloride or chlorobromide. Other suitable bromine and/or chlorine sources are known to those skilled in the art, or may come to be known to those skilled in the art and having the benefit of the teachings of this specification. Compositions as used in this invention can comprise bromine chloride, a bromine source, and a chlorine source. Compositions as used in this invention can comprise bromine chloride, bromine, and chlorine.

Sorbent Compositions

Several procedures can be used to incorporate bromine and chlorine onto sorbents such as activated carbon. In one such procedure, referring to FIG. 1, the desired weight of activated carbon 8 is placed into column 10, which is located within heating/cooling jacket 11. Coarse sintered glass (not shown) supports activated carbon 8 in column 10. Stopcock 12 is open and stopcock 14 is closed to evacuate the entire system 7 to a pressure of 5 mm Hg. The column 10 is heated via the heating jacket 11 to 95 deg C and held at 95 deg C for one hour to remove moisture. Then the column 10 is allowed to cool to room temperature and stopcock 12 is closed. The activated carbon 8 is now moderately dry and degassed. The desired amount of bromine chloride 19 is put into the round-bottom flask 20. The boiling point of bromine chloride is 4 deg C so the flask 20 is cooled to below 4 deg C. Cooling is stopped and stopcock 14 is opened to introduce bromine chloride 19 onto the activated carbon 8 in column 10. Cooling water is flowed through the cooling jacket 11 to remove the heat of adsorption produced during this process. Adsorption is typically completed within several hours, depending upon the size of the batch produced. Excess bromine chloride is removed by opening stopcock 12 and passing a stream of air or nitrogen through the column 10 at room temperature and/or optionally heating up to 150 deg C via heating jacket 11. The now bromine chloride-treated activated carbon 8 is transferred to a suitable container (not shown in the FIGURE) and blended for use. Other suitable procedures for incorporating bromine and chlorine onto sorbents such as activated carbon will be known, or may come to be known, to those skilled in the art and having the benefit of the teachings of this specification.

Thermal Stability

Thermal stability of a substance can be assessed, e.g., via the temperature of initial energy release, a.k.a., the point of initial oxidation (PIO) of the substance. As used in this specification, including the claims, the PIO of compositions and/or sorbents of this invention is defined as the temperature at which the heat flow, as determined by DSC, is 1.0 W/g with the baseline corrected to zero at 100 deg C. A composition of this invention has improved thermal stability as compared to the sorbent that is used in such composition in that the composition has a PIO that is at least about 10 deg C higher than the PIO of the sorbent alone. A composition of this invention can have a PIO that is at least about 10 deg C to about 94 deg C, or about 10 deg C to about 90 deg C, or about 10 deg C to about 50 deg C, or about 20 deg C to about 80 deg C, higher than the PIO of the sorbent alone.

Combustible Fuels

Processes and sorbent compositions of this invention are suitable for reducing mercury emissions in combustion gas streams resulting from combustion of any combustible fuel comprising mercury. Such combustible fuels include coal, natural gas, solid or fluid waste, and other substances.

EXAMPLES

The following examples are illustrative of the principles of this invention. It is understood that this invention is not limited to any one specific embodiment exemplified herein, whether in the examples or the remainder of this patent application.

For the following examples, we treated a sample of wood-derived activated carbon (thermally activated wood) with bromine chloride. The performance of this sample was compared to similar activated carbon samples treated with simply elemental bromine, elemental chlorine, sodium bromide, or potassium bromide. Commercial products are available that utilize sodium or potassium bromide. Performance tests included DSC, which measures of the thermal properties of the activated carbon, and a lab test for mercury capture, in some cases.

Example 1

Comparative Example

The wood-derived PAC (powdered activated carbon) (prepared by the thermal activation process) utilized in these examples was analyzed by DSC-TGA. The point of initial energy release (PIO) was 267 deg C.

Example 2

Comparative Example. Treatment of PAC with Bromine

PAC of Example 1 was brominated according to the process disclosed in U.S. Pat. No. 6,953,494. Elemental analysis indicated a PAC bromine content of 5 wt %. Analysis by DSC indicated that the PIO was 364 deg C.

Example 3

Comparative Example. Treatment of PAC with Chlorine

PAC of Example 1 (9.5 g) was treated with a known amount of gaseous elemental chlorine (0.53 g). Elemental analysis indicated a PAC chlorine content of 6 wt %. Analysis by DSC indicated that the PIO was 356 deg C.

Example 4

Treatment of PAC with Bromine Chloride

PAC of Example 1 (9.6 g) was treated with a known quantity of bromine chloride generated by combining bromine (0.36 g) with chlorine (0.15 g). Elemental analysis indicated a PAC bromine chloride content of 6 wt %. Analysis by DSC indicated that the PIO was 361 deg C.

Example 5

Comparative Example. Treatment of PAC with Sodium Bromide

The PAC of Example 1 was treated with a known quantity of sodium bromide. Elemental analysis indicated a PAC bromide content of 5 wt %. Analysis by DSC indicated that the PIO was 275 deg C.

Example 6

Comparative Example. Treatment of PAC with Potassium Bromide

The PAC of Example 1 was treated with a known quantity of potassium bromide. Elemental analysis indicated a PAC bromide content of 5 wt %. Analysis by DSC indicated that the PIO was 270 deg C.

Mercury Capture Data for Examples 1-4

The following data indicate that the PAC treated with bromine chloride provided surprisingly good mercury capture when compared to mercury capture of the untreated PAC and of PAC treated with chlorine alone. These data were obtained using the mercury capture device described in U.S. Pat. No. 6,953,494.

| PAC | Mercury Capture, (%, Avg) |
| --- | --- |
| Example 1 (Comparative) | 46 |
| Example 2 (Comparative) | 72 |
| Example 3 (Comparative) | 41 |
| Example 4 | 65 |

As shown by these examples, I have found that, surprisingly, compositions of this invention, which comprise a bromine source, a chlorine source, and a sorbent capable of adsorbing bromine and chlorine, have a PIO that is not only higher than the PIO of the sorbent itself, but is nearly as high as the PIO of a composition comprising the sorbent and a bromine source (i.e., no measurable amounts of chlorine are present). Also, the mercury emission reduction capability of compositions and processes of this invention is very good, although not quite as good as compositions consisting essentially of sorbent and bromine (i.e., no measurable chlorine or other halogens). This is surprising because chlorine by itself can actually reduce the mercury emission reduction capability of a sorbent. This invention is particularly commercially advantageous given that chlorine is markedly less costly than bromine.

This invention is particularly advantageous in that it accommodates the use of chlorine, which is less expensive than bromine, and the use of wood-derived activated carbon in mercury capture.

It is to be understood that the reactants and components referred to by chemical name or formula anywhere in the specification or claims hereof, whether referred to in the singular or plural, are identified as they exist prior to being combined with or coming into contact with another substance referred to by chemical name or chemical type (e.g., another reactant, a solvent, or etc.). It matters not what chemical changes, transformations and/or reactions, if any, take place in the resulting combination or solution or reaction medium as such changes, transformations and/or reactions are the natural result of bringing the specified reactants and/or components together under the conditions called for pursuant to this disclosure. Thus the reactants and components are identified as ingredients to be brought together in connection with performing a desired chemical reaction or in forming a combination to be used in conducting a desired reaction. Accordingly, even though the claims hereinafter may refer to substances, components and/or ingredients in the present tense ("comprises", "is", etc.), the reference is to the substance, component or ingredient as it existed at the time just before it was first contacted, combined, blended or mixed with one or more other substances, components and/or ingredients in accordance with the present disclosure. Whatever transformations, if any, which occur in situ as a reaction is conducted is what the claim is intended to cover. Thus the fact that a substance, component or ingredient may have lost its original identity through a chemical reaction or transformation during the course of contacting, combining, blending or mixing operations, if conducted in accordance with this disclosure and with the application of common sense and the ordinary skill of a chemist, is thus wholly immaterial for an accurate understanding and appreciation of the true meaning and substance of this disclosure and the claims thereof. As will be familiar to those skilled in the art, the terms "combined", "combining", and the like as used herein mean that the components that are "combined" or that one is "combining" are put into a container, e.g., a combustion chamber, a pipe, etc. with each other. Likewise a "combination" of components means the components having been put together in such a container.

While the present invention has been described in terms of one or more preferred embodiments, it is to be understood that other modifications may be made without departing from the scope of the invention, which is set forth in the claims below.

What is claimed is:

1. A process comprising:
    adding a composition comprising a bromine source, a chlorine source, and a sorbent capable of adsorbing bromine and chlorine to a combustible fuel prior to and/or during combustion of the combustible fuel;
    combusting the combustible fuel;
    producing a combustion gas stream;
    thereby reducing mercury emissions from the combustion gas stream.
2. The process of claim 1, wherein the combustible fuel comprises coal.
3. The process of claim 1, wherein the sorbent comprises a carbonaceous substrate.
4. The process of claim 1, wherein the sorbent comprises activated carbon.
5. The process of claim 1, wherein the sorbent comprises a wood-derived activated carbon or a coconut shell-derived activated carbon.
6. The process of claim 1, wherein the composition has a PIO that is at least about 10 deg C. higher than the PIO of the sorbent alone.
7. The process of claim 1, wherein the bromine source comprises bromine or HBr.
8. The process of claim 1, wherein the chlorine source comprises chlorine or HCl.
9. The process of claim 1, wherein the bromine source and/or the chlorine source comprises bromine chloride.
10. The process of claim 1, wherein the composition also comprises bromine chloride.
11. A process comprising:
    adding a composition comprising bromine chloride and a sorbent capable of adsorbing bromine and chlorine to a combustible fuel prior to and/or during combustion of the combustible fuel;
    combusting the combustible fuel;
    producing a combustion gas stream;
    thereby reducing mercury emissions from the combustion gas stream.

* * * * *